US008436723B2

(12) United States Patent
Siavoshani et al.

(10) Patent No.: US 8,436,723 B2
(45) Date of Patent: May 7, 2013

(54) VEHICULAR INFORMATION AND MONITORING SYSTEM AND METHOD

(76) Inventors: Saeed J Siavoshani, Bloomfield Hills, MI (US); George Cheng, Randolph, NJ (US)

( * ) Notice: Subject to any disclaimer, the term of this patent is extended or adjusted under 35 U.S.C. 154(b) by 0 days.

(21) Appl. No.: 11/807,406

(22) Filed: May 29, 2007

(65) Prior Publication Data

US 2008/0297334 A1 Dec. 4, 2008

(51) Int. Cl.
*B60Q 1/00* (2006.01)

(52) U.S. Cl.
USPC .......................................... 340/439; 340/438

(58) Field of Classification Search .................. 340/939, 340/426.15, 436, 438, 439, 443, 459, 501, 340/517, 539.22, 539.24; 701/1, 29, 30, 701/31, 102, 111
See application file for complete search history.

(56) References Cited

U.S. PATENT DOCUMENTS 4,845,464 A * 7/1989 Drori et al. .................... 340/429
5,257,190 A * 10/1993 Crane .......................... 701/33.4
5,445,347 A * 8/1995 Ng ............................ 246/169 R
5,482,314 A * 1/1996 Corrado et al. ............... 280/735
5,551,298 A * 9/1996 Rayment ......................... 73/669
5,684,718 A * 11/1997 Jenkins et al. .................. 702/57
5,754,965 A * 5/1998 Hagenbuch .................. 701/32.5
5,893,892 A 4/1999 Loeffler
5,963,884 A * 10/1999 Billington et al. .............. 702/56
6,026,340 A * 2/2000 Corrado et al. ................. 701/47
6,044,343 A * 3/2000 Cong et al. .................... 704/236
6,091,325 A * 7/2000 Zur et al. ...................... 340/455
6,101,432 A * 8/2000 Her et al. ...................... 701/33.6
6,137,886 A * 10/2000 Shoureshi .................... 381/71.2
6,324,290 B1 11/2001 Murakami et al.
6,738,697 B2 5/2004 Breed
6,775,642 B2 8/2004 Remboski et al.
6,778,894 B2 8/2004 Beck et al.
6,823,244 B2 11/2004 Breed
7,319,390 B2 * 1/2008 Takasuka et al. ............. 340/541
7,421,321 B2 * 9/2008 Breed et al. .................. 701/33.6
7,539,597 B2 * 5/2009 Wegerich et al. ............. 702/185
7,650,210 B2 * 1/2010 Breed .......................... 701/31.9
2001/0002451 A1 5/2001 Breed
2004/0243351 A1 12/2004 Calkins et al.
2005/0066730 A1 3/2005 Raichle
2005/0125117 A1 6/2005 Breed
2005/0192727 A1 * 9/2005 Shostak et al. .................. 701/37
2005/0206610 A1 * 9/2005 Cordelli ........................ 345/156
2006/0197660 A1 * 9/2006 Luebke et al. ........... 340/539.26
2008/0004875 A1 * 1/2008 Chengalvarayan et al. .. 704/234

* cited by examiner

*Primary Examiner* — Albert K Wong
*Assistant Examiner* — Rufus Point
(74) *Attorney, Agent, or Firm* — Richard W. Hoffman; Reising Ethington PC

(57) ABSTRACT

A vehicle monitoring system is provided that is particularly useful for gathering data relating to noise, vibration and harshness (NVH). The system may include noise and vibrations sensors that sense the noise or vibration levels at various vehicle locations. The sensors generate an output signal that is analyzed by a control unit. The control unit compares the output signal with a predetermined value and if the predetermined value is exceeded, the control unit stores the information. The control unit may also receive information from the engine control unit and store that information also. Information from the sensors may also be stored at predetermined intervals. The information may be downloaded to an output device for storing the data and building a database.

9 Claims, 3 Drawing Sheets

VEHICULAR INFORMATION AND MONITORING SYSTEM AND METHOD

FIELD OF THE INVENTION

The present invention relates to a method and assembly for monitoring vehicle information, particularly vehicle information related to noise, vibration and harshness.

BACKGROUND OF THE INVENTION

Noise, vibration and harshness (NVH) are primary concerns of automobile manufacturers. NVH analyzers have been used to isolate and diagnose the sources of sound and vibration attributed to various components of the vehicle, such as power train components, engine, transmission, drive train, drive shafts, flexible joints, bearings, the wheels and tires, as well as air leak from the passenger compartment.

Some such analyzers are disclosed in United States Patent Application Publication No. US2004/0243351 to Calkins et al and United States Patent Application Publication No. US2005/0066730 to Raichle. Another such system is shown in U.S. Pat. No. 6,324,290 to Murakami et al. Another such analyzer is disclosed in United States Patent Application Publication No. US2005/0125117 to Breed. The Breed application discloses a vehicle information and monitoring system and method. In Breed, a plurality of sensors may be used to monitor various vehicle systems. Typically, the sensors include those already available on a vehicle.

One limitation on each of the systems provided is that the systems are designed to monitor and analyze instant conditions of the vehicle. None of the systems disclose the use of long term data collection for providing information to the manufacturer regarding long term performance of the vehicle.

It is particularly beneficial to a vehicle manufacturer to have long term NVH data available to aid in designing future NVH abatement systems. More specifically, by knowing the sources of noise and vibration over a long period of time will help focus manufacturers to develop further NVH abatement technologies

SUMMARY OF THE INVENTION

According to one embodiment the present invention there is a provided a vehicle monitoring system comprising at least one sensor for determining a condition in a vehicle and generating an output signal indicative of the condition. The system comprises a control until coupled with a sensor for receiving the output signal from the sensor. The control unit is capable of receiving the signal and comparing the signal from the sensor with a predetermined value and storing the information from the sensor when a predetermined value is exceeded or for storing information from the sensor at a predetermined interval.

According to another embodiment of the present invention there is provided a method of monitoring vehicle systems comprising sensing a condition in a vehicle. An output signal is generated that is indicative of the condition. The output signal is comprised with a predetermined value. The information from the output signal is stored when a predetermined value is exceeded or when a predetermined interval is reached.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE INVENTION

Figure 1:
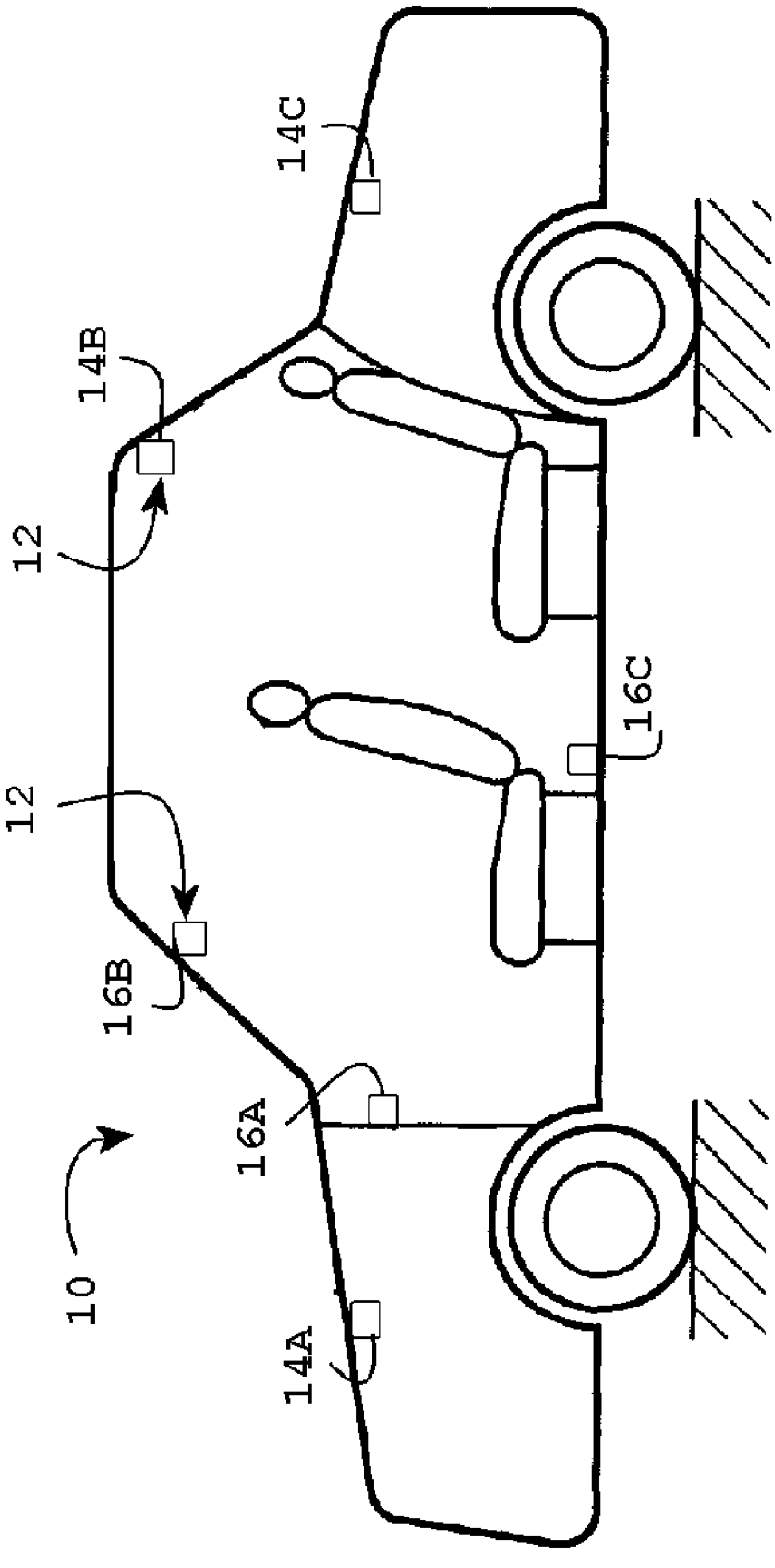
FIG. 1 is a schematic view of an automobile incorporating a vehicular information monitoring system according to one embodiment of the present invention.

FIG. 1 is a schematic of an automobile incorporating a vehicular information monitoring system generally indicated at 10. In general, the vehicle monitoring system 10 includes a plurality of sensors generally indicated at 12. The sensor 12 can comprise any of a variety of type of sensors and can be located at virtually any location on the vehicle. It is contemplated that the sensors 12 may comprise, for example, microphones 14A, 14B and 14C. These microphones 14A, 14B and 14 C may be located at any location on the vehicle. As shown, one microphone 14A is located within the engine compartment of the vehicle. A second microphone 14 B is located within the vehicle compartment of the vehicle. Also, a third microphone 14C is located within the storage compartment of the vehicle. Again, while three microphones are shown, it will be appreciated that any number of microphones may be use and placed at any vehicle location.

The microphones 14A, 14B and 14C are for detecting sounds occurring at that particular location in the vehicle. It is preferred that the microphones be placed at locations where the information regarding sound level is desired. It will be appreciated that the sound recorded by the microphones 14A, 14B and 14C preferably merely consists of the noise level at that microphone in, for example, decibels or physical units. That is, the microphones 14A, 14B and 14C preferably do not record the actual sounds being made.

Vibration sensors 16A, 16B and 16C are also contemplated within the present invention. It will be appreciated that the vibration sensors 16A, 16B and 16C can constitute any well known type of sensors, such as acceleration sensors. The vibration sensors 16A, 16B and 16C, like the microphones, can be placed at any location in the vehicle. However, it is primarily contemplated that such vibration sensors be connected in areas subject to vibration, such as the firewall 16A, support pillars 16B, roof and floor 16C of the vehicle.

Figure 2:
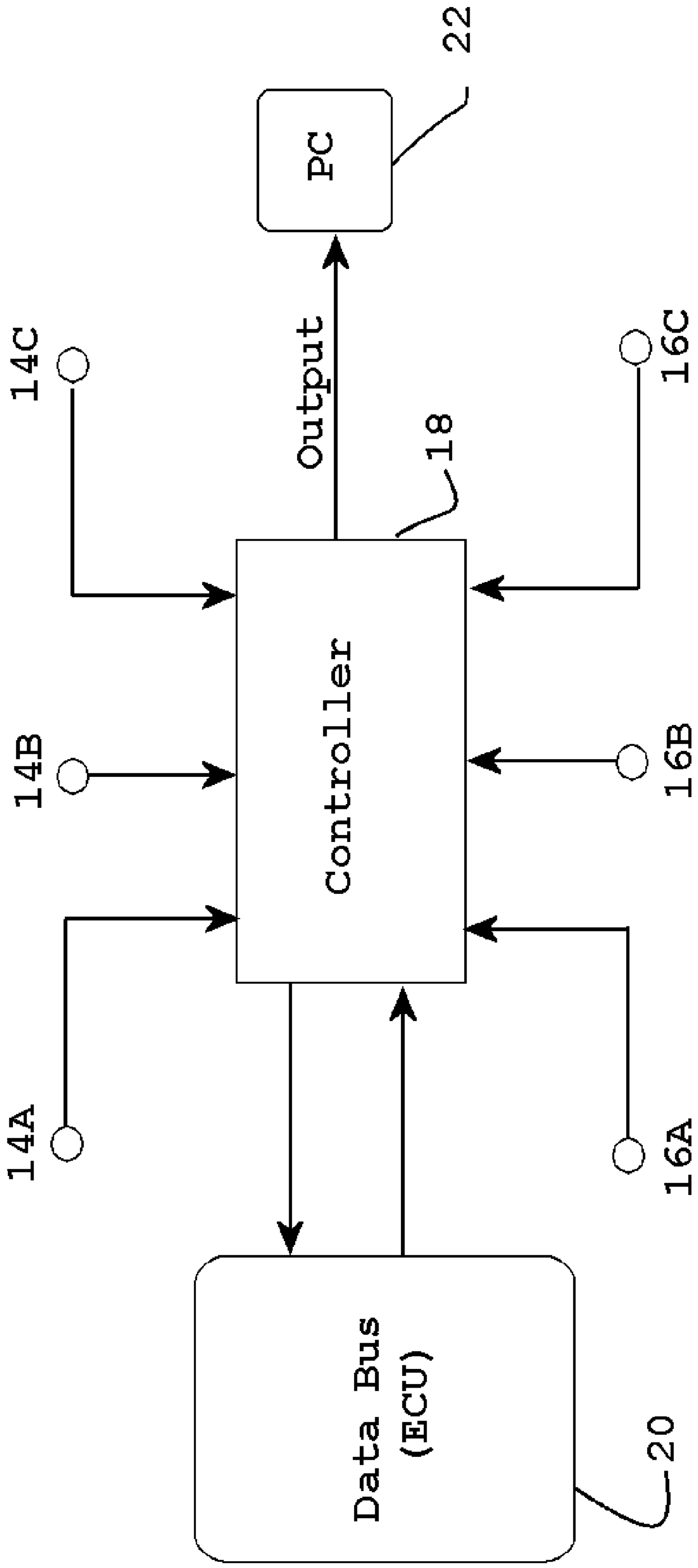
FIG. 2 is a schematic block diagram of the a vehicular information monitoring system according to one embodiment of the present invention.

Sensors, such as microphones 14 and vibration sensors 16 are well known in the industry. It will be appreciated at any suitable microphone 14 or vibration sensor 16 may be used within the scope of the present invention. The microphones 14 and vibration sensors 16 thus determine a conclusion (e.g., noise or vibration) in a vehicle and generate an output signal indicative of that condition. The microphones 14 and vibration sensors 16 may be hard wired to a control unit 18 (FIG. 2). Alternatively, the microphones and vibration sensors may be coupled with the control unit 18 via a wireless connection. Any suitable connection or coupling of the microphones and vibration sensors with the control unit 18 is contemplated within the scope of the present invention Further, the microphone 14 and vibration sensor 16 may detect sounds or vibrations respectfully in the form of an analog or a digital signal. When an analog sensor is used, it is preferred that the analog value be converted to a digital value by any suitable analog/digital converting device.

FIG. 2 is a block diagram schematically illustrating the vehicular information and monitoring system according to one embodiment of the present invention. As shown in FIG. 2, the various microphones 14A-14C are coupled with the control unit generally indicated at 18. Similarly, the various vibration sensors 16A-16C are also coupled with the control unit 18. It will be appreciated that the control unit 18 may take any suitable form for receiving the output signal from the microphones 14A-14C and vibration sensors 16A-16C. The control unit 18 may include an A/D converter, if necessary. Further, the control unit 18 preferably comprises a microprocessor.

The control unit 18 is further coupled with the vehicle data bus system, which is often referred to as the engine control unit 20. Preferably, the control unit 18 is in two-way communication with the engine control unit 20. The coupling with the vehicle data bus system requires attention to many factors. These include an appropriate communication protocol and capable microprocessors. Further required are appropriate device controller hardware and software for the required sensors. However, such issues are well known to those skilled in the art and will not be further described.

The communication system can be based on the CAN-bus protocol which is a common protocol used in the automotive industry. It will be appreciated, that the communication can be based on any acceptable protocol. It will further be appreciated that the engine control unit 20 referred to herein is any unit on the vehicle from which information related to the vehicle operating parameters of the vehicle may be determined. Indeed, such available information may include, but is not necessarily limited to engine rpm, speed, temperature (both interior and exterior), wheel speed, weight, clock information, odometer information, tire pressure, HVAC position, window position and altitude.

As can be seen in FIG. 2, it is preferred that the engine control unit 20 be coupled in two-way communication with the control unit 18. In this manner, the control unit 18 may request information from the engine control unit 20 and the engine control unit 20 may, in response to such a request, provide via signal, information to the control unit 18. Alternatively, the control unit 18 may constantly monitor the engine control unit 20. In this manner, it may not be necessary for the control unit 18 to be in two way communication with the engine control unit 20.

It will be appreciated that certain levels of noise and vibration are acceptable within a vehicle. This level may vary with the location at which the noise or vibration affect the vehicle. The present invention is particularly useful for gathering long term data to determine whether discreet areas of the vehicle are operating within acceptable parameters over time. In the event that the vehicle is operating outside acceptable parameters, such deviations are collected and stored by the control unit 20.

It is particularly beneficial to gather long term information for providing information to manufacturers regarding long terms NVH performance of their vehicles and the operating parameters at which deviations from acceptable levels occur. Further, it is desirable to maintain this information with respect to discreet locations on the vehicle.

To this end, the control unit 18 can contain a series of operating instructions. The operating instructions can be contained on any memory available for access by the microprocessor, such as, but not necessarily limited to, flash-type memory. The microprocessor can also receive stored information from the memory indicating acceptable noise and vibration characteristics for the vehicle. The control unit 20 monitors the noise level from the microphones 14A-14C and vibration levels from the vibration sensors 16A-16C and compares them with acceptable levels stored in the memory available to the control unit control unit 18. If an acceptable noise or vibration level is exceeded, the microprocessor can trigger the control unit 18 to store certain information in suitable memory such as ram-type memory. It will be appreciated that while ram-type memory is disclosed herein, any suitable memory may be used.

When a predetermined value has be exceeded, the control unit 18 preferably queries the engine control unit for 20 for operating parameters of the vehicle, such as, but not necessarily limited to engine rpm, vehicle speed, odometer information, HVAC position and window position. Other information that can be monitored includes any information collected by the engine control unit, such as, but not limited to, throttle position, interior and exterior temperature, tire pressure, or any other desired system to be monitored.

The control unit 18 then records the noise or vibration level from one of the sensors 14A-C, 16 A-C along with any information desired to be recorded. By way of example, the control unit 18 may determine that a noise level of a certain microphone 14B is exceeded. Under that condition, the noise level, sensor information, i.e. which sensor is recorded. Additionally, other parameters may be simultaneously recorded. such as the odometer reading, the engine speed and HVAC position. This information is then stored.

While the above example stores the information from only one sensor, it will be appreciated that the readings from any or all of the sensors may simultaneously be stored. The information will be correlated with the vehicle operating parameters also monitored.

By continually monitoring and saving exceeded noise or vibration levels and the associated operating vehicle parameters, it is possible to help determine the long term NVH characteristics of the vehicle. This data can be used by OEMs to better alleviate long term NVH concerns.

In order for the information to be used, it must be outputted from the control unit 18. The information can be outputted by the microprocessor in a variety of manners. One such manner contemplated by the present invention is when the vehicle is brought into a repair facility. The repair technician can simply plug a suitable device, such as a PC 22, into the control unit 18 to download the saved data from the control unit 18. The outputted information can then be transmitted from the repair facility to the OEM in any suitable fashion, such as, for example, via the internet. The manufacturer may then collect data from a variety of sources to build a database. In this manner, long term NVH of the OEMs' vehicles can be monitored.

Alternatively, the information may be sent to a central repository, where the information from many sources can be gathered. The central repository can then review the data and provide it in any form to a customer, such as an OEM. Reports can be made as can analyses of the data.

While the output device is shown to be to a PC 22, it will be appreciated that the output of the control unit 18 may be made in any manner. One such other example is that the output may be sent via a cellular phone or other communication system. The microprocessor can be programmed to transmit the data at predetermined intervals directly to the manufacturer using such a system.

While it has been described that the control unit 18 will save the data only when a predetermined noise or vibration has been exceeded, it will be appreciated that it may be important also to simply collect the noise or vibration data from each microphone 14A-C and vibration sensor 16A-C also at regular intervals, for example, every 10,000 miles. In this manner, a substantial database can be build to continually monitor the vehicle's NVH performance. Thus, the control unit 18 most preferably records information at various predetermined intervals and additionally when certain predetermined values are exceeded.

Figure 3:
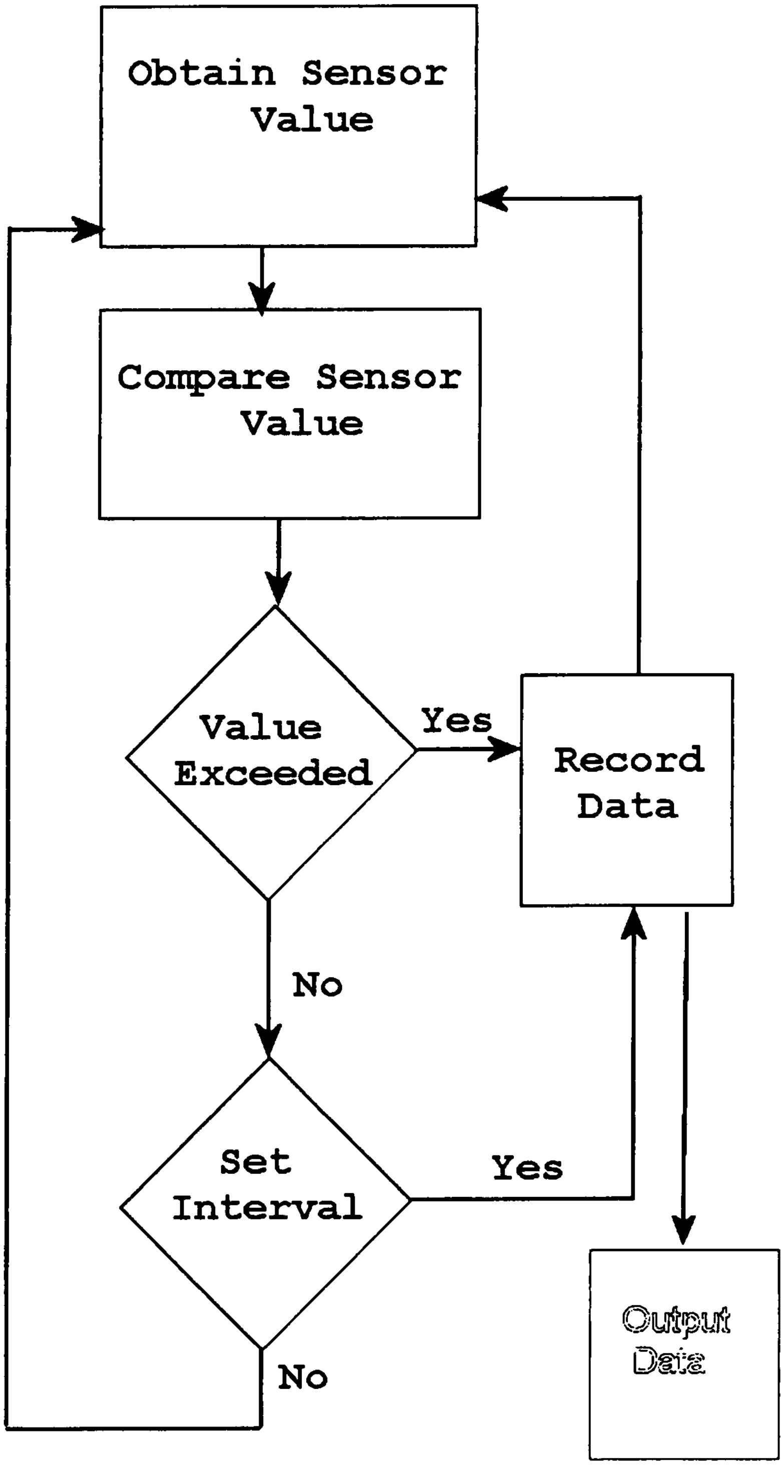
FIG. 3 is a flow diagram of a vehicular information monitoring system according to one embodiment of the present invention.

FIG. 3 is a flow diagram of a vehicular information monitoring system according to one embodiment of the present invention. The flow diagram shows various steps. As shown, the noise and vibration values of the vehicle are obtained. These values are compared with predetermined values. If the value of any sensor exceeds the predetermined value, then the value of any number of sensors is recorded along with any other vehicle parameter desired to be recorded. This information is stored on any suitable storage media. Then the noise and vibration values are again obtained.

If the noise and vibration levels do not exceed a predetermined level, then a determination is made if a predetermined interval (such as 10,000 miles) has elapsed. If so, the value of any number of sensors is recorded along with any other vehicle parameter desired to be recorded. This information is stored on any suitable storage media. Then the noise and vibration values are again obtained.

At a proper point, the information is downloaded from the control unit 20. One such acceptable time is during servicing of the vehicle. The repair technician simply downloads the data, perhaps to a PC 22, using any suitable system. The repair facility can then forward the information to a repository or a manufacturer. Alternatively, the information can be periodically downloaded, such as at a predetermined interval of days by using a cellular phone system.

The invention has been described in an illustrative manner and the terminology which has been used is intended to be in the nature of words of description rather than of limitation. It will be appreciated that the invention is set forth in the claims and may be practiced other than as specifically described above.

What is claimed is:

1. A vehicle monitoring system comprising:

a plurality of noise and vibration level sensors for determining noise and vibration levels in various locations in a vehicle during operation of the vehicle and generating output signals indicative of the noise and vibration levels, at least one of said noise or vibration level sensors located in the passenger compartment of the vehicle;

a control unit coupled with said noise and vibration level sensors for receiving said output signal from said noise and vibration level sensors, wherein said control unit is capable of receiving said output signals and comparing said output signals from said noise and vibration level sensors with a predetermined value and storing information from said noise and vibration level sensors when a predetermined value is exceeded and for storing information from said noise and vibration level sensors at a predetermined interval;

an engine control unit coupled with said control unit wherein said control unit coordinating the output signal of from the noise and vibration level sensors with information from said engine control unit to thereby build a database of the noise and vibration levels coordinated with the information from said engine control unit of the vehicle over time.

2. A vehicle monitoring system as set forth in claim 1 further comprising an output device for receiving stored information from said control unit.

3. A vehicle monitoring system as set forth in claim 1 wherein said noise or vibration level sensors are hard wired to the control unit.

4. A vehicle monitoring system as set forth in claim 1 wherein said noise or vibration level sensors are coupled with said control unit via a wireless connection.

5. A method of monitoring vehicle systems comprising:

sensing a noise and vibration condition in a vehicle during operation of the vehicle;

generating an output signal indicative of the noise and vibration condition;

comparing the output signal with a predetermined value;

obtaining information from an engine control unit and coordinating the information from the engine control unit with the output signal and with information from said engine control unit;

storing the coordinated information when a predetermined value is exceeded and when a predetermined interval is reached to thereby build a database of the noise and vibration levels coordinated with the information from said engine control unit of the vehicle over time.

6. A method as set forth in claim 5 further comprising sensing the noise and vibration conditions with a plurality of noise and vibration level sensors, at least one of which is within the passenger compartment of the vehicle.

7. A method as set forth in claim 5 wherein a control unit is used to compare the output signal with the predetermined value and to store the coordinated information.

8. A method as set forth in claim 7 further comprising downloading the stored information from control unit.

9. A method as set forth in claim 8 further comprising building a database containing the downloaded information.

* * * * *